United States Patent [19] [11] 3,759,353
Marin [45] Sept. 18, 1973

[54] DISC BRAKE CONTAINING REINFORCED CARBON BODIES

[75] Inventor: Glenn R. Marin, Ransomville, N.Y.

[73] Assignee: The Carborundum Company, Niagara Falls, N.Y.

[22] Filed: Sept. 7, 1971

[21] Appl. No.: 178,393

Related U.S. Application Data

[62] Division of Ser. No. 48,063, June 22, 1970, Pat. No. 3,712,428.

[52] U.S. Cl............ 188/71.5, 188/73.2, 188/251 A, 192/107 M, 423/447
[51] Int. Cl............................................. F16d 55/36
[58] Field of Search...................... 188/73.2, 251 A, 188/71.1, 71.5; 192/107 M; 117/46 CC, 215; 423/447; 264/29; 161/170

[56] References Cited
UNITED STATES PATENTS

| | | | |
|---|---|---|---|
| 3,639,197 | 2/1972 | Spain | 188/251 A |
| 3,672,936 | 6/1972 | Ehrenreich | 117/46 CC |
| 3,131,089 | 4/1964 | Grulke et al. | 117/215 |
| 3,473,637 | 10/1969 | Rutt | 188/251 R |
| 3,552,533 | 1/1971 | Nitz | 188/251 A X |
| 3,650,357 | 3/1972 | Nelson et al. | 188/251 R |

Primary Examiner—George E. A. Halvosa
Attorney—K. S. Brownell

[57] ABSTRACT

The strength of circumferentially wound carbon-fiber reinforced carbon bodies is vastly improved if the reinforcing fibers are wound loosely, to a width greater than the axial thickness of the desired carbon body, and then axially compressed to cause radial overlapping of the carbon fibers. This technique is particularly useful for carbon bodies having an irregular perimeter, such as brake discs containing keyways or other indentations for bearing circumferential stress, since the reinforcing fibers adjacent to the stress-bearing perimeter can be made to conform substantially to the shape of the perimeter and the indentations therein.

4 Claims, 19 Drawing Figures

Patented Sept. 18, 1973
3,759,353
6 Sheets-Sheet 2
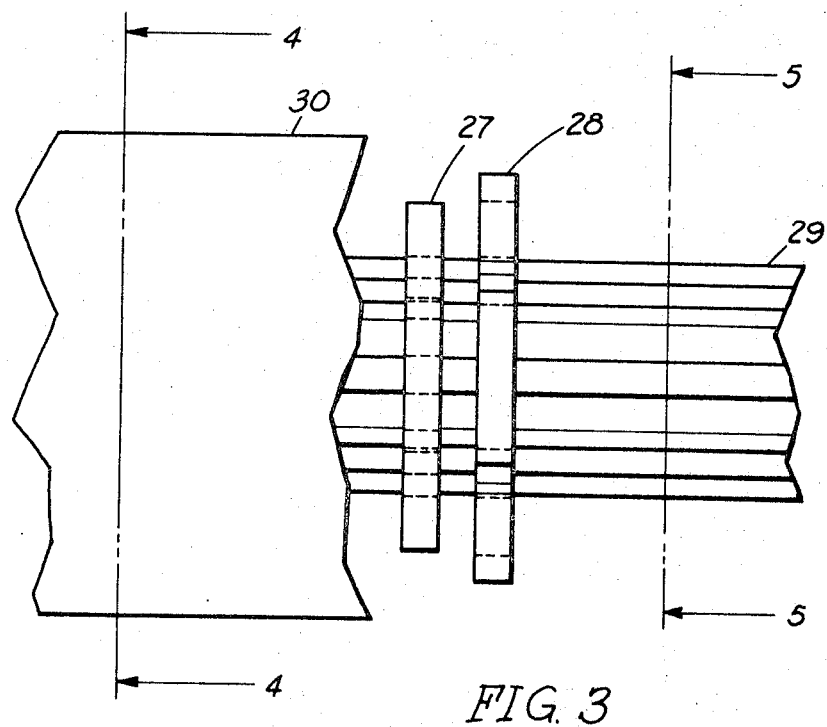
FIG. 3
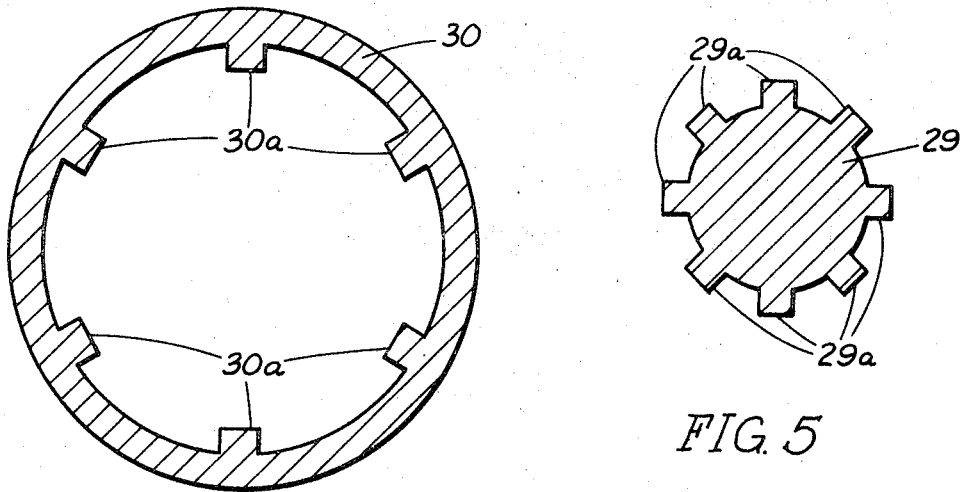
FIG. 4
FIG. 5

Patented Sept. 18, 1973

Patented Sept. 18, 1973 3,759,353

DISC BRAKE CONTAINING REINFORCED CARBON BODIES

This is a division of copending application Ser. No. 48,063, filed June 22, 1970, now U.S. Pat. No. 3,712,428.

BACKGROUND OF THE INVENTION

This invention relates to reinforced carbon bodies. More particularly, it relates to reinforced carbon bodies comprising an underlying network of reinforcing carbon fibers, which forms the skeleton of the carbon body; and a matrix of carbonized carbonaceous binder, which binds together the underlying network of reinforcing carbon fibers into a coherent body. Such bodies usually contain from about 40 to about 90 percent by volume of reinforcing carbon fibers, preferably about 65 percent; and from about 10 to about 60 percent by volume of carbonized carbonaceous binder, preferably about 35 percent. As used herein, the term "carbon" includes both ungraphitized and graphitized carbon. Thus, a reinforced carbon body can comprise either graphite, partially graphitized or ungraphitized reinforcing carbon fibers, or a mixture thereof; and either graphite, partially graphitized or ungraphitized carbonized binder. If the binder is graphitized, however, usually the underlying network of reinforcing fibers also becomes graphitized.

Reinforced carbon bodies can also include materials other than carbon to modify their properties in various ways. For example, copending commonly assigned U.S. patent application Ser. No. 644,623, filed June 8, 1967, by W. H. Carlson and J. J. McGahan, and now abandoned, describes the use of reinforcing fibers coated with refractory materials to improve interlaminar shear strength; and copending commonly assigned U.S. patent application Ser. No. 722,158, filed Apr. 18, 1968, by L. C. Ehrenreich, now U.S. Pat. No. 3,672,936, describes the use of boron and boron compounds to improve several properties.

The specific reinforced carbon bodies with which the present invention is particularly concerned are those which are subjected to circumferential stress. A prime example of such a carbon body is a friction disc for use in disc brakes. These discs are essentially annular in shape, having outer and inner perimeters, one perimeter of each disc being provided with indentations to bear the stress of arresting rotary motion of a rotating body. Disc brakes commonly contain a plurality of discs with internal and external indentations, alternately arranged in a parallel coaxial fashion, so that the discs with either internal or external indentations rotate with the body whose rotary motion is to be arrested, while the other discs are prevented from rotating. When it is desired to activate the brake, the discs are pressed together by axial forces to cause contact between the rotating and nonrotating discs. When contact occurs, the mechanical energy of the rotating body is converted to heat. Because of carbon's strength, density, heat capacity, thermal conductivity, coefficient of friction and stability up to its sublimation temperature (about 3600°C), carbon has been proposed for use in disc brakes, particularly when weight is a major consideration (such as in aircraft).

As mentioned above, the shape of such brake discs is essentially annular. Thus, the discs have an inner perimeter, an outer perimeter, and two opposite faces adjoining both perimeters. These opposite faces are usually essentially flat and mutually parallel, and perpendicular to the axis of the discs, so as to maximize the area of contact with adjacent discs.

Various shapes have been proposed for the perimeters. Usually one perimeter is circular to permit unrestricted rotation, and the other perimeter has indentations to bear circumferential stress. A common shape for such indentations is rectangular, such as the keyways in FIGS. 1 and 2. Scalloped shapes have also been proposed, as in R. D. Rutt, U.S. Pat. No. 3,473,637 and in copending commonly assigned U.S. patent application Ser. No. 875,841, filed Nov. 12, 1969, by W. J. Spry, now U.S. Pat. No. 3,621,945.

Reinforced carbon bodies, comprising an underlying network of reinforcing carbon fibers and a matrix of carbonized binder, have been the preferred form of carbon for this use. The various orientations of reinforcing carbon fibers proposed for such carbon bodies have, however, been subject to various shortcomings.

It is therefore, an object of this invention to provide an improved orientation of reinforcing fibers for reinforced carbon bodies.

Another object is to provide an improved reinforced carbon body.

Another object is to provide a reinforced carbon body having improved resistance to circumferential stress.

Other objects include the provision of a process to produce such carbon bodies, and the combination of such carbon bodies in the form of brake discs in a disc brake.

SUMMARY OF THE INVENTION

These and other objects are accomplished with a reinforced carbon body comprising (1) an underlying network of reinforcing carbon fibers; and (2) a matrix of carbonized binder binding together the underlying network of reinforcing fibers, characterized in that the reinforcing fibers comprise successively circumferentially wound, axially compressed, radially overlapping fibers. The most important features are axial compression and radial overlapping. In preferred embodiments, these carbon bodies have at least one perimeter which is adapted to bear circumferential stress, and the circumferentially wound reinforcing fibers adjacent to the stress-bearing perimeter conform substantially to the shape of the stress-bearing perimeter, including any indentations therein adapted to bear circumferential stress.

Broadly stated, such bodies can be produced by
1. successively circumferentially winding reinforcing carbon fibers loosely about a mandrel to form an assembly of loosely wound carbon fibers having
   a. an outer perimeter at least as great as the length of the desired outer perimeter of the finished carbon body, and
   b. a width substantially greater than the desired axial thickness of the finished carbon body;
2. placing the assembly of loosely wound carbon fibers in a mold cavity of a mold comprising
   a. an outer perimeter conforming substantially to the desired size and shape of the outer perimeter of the desired carbon body; and
   b. a pair of compression plates having mutually opposed faces which conform substantially to the desired sizes and shapes of the faces of the desired carbon body; said plates being coaxially aligned with each other and with the mold outer perimeter and defining, with said mold outer perimeter, a mold cavity, the distance between said plates being variable by axial movement;
3. axially moving the compression plates together until the plates are separated by approximately the desired axial thickness of the finished carbon body, whereby the circumferentially wound carbon fibers become axially compressed and radially overlapping;
4. introducing a carbonizable binder between the carbon fibers and
5. carbonizing the carbonizable binder, whereby to form a carbon matrix binding together the reinforcing carbon fibers.

In another aspect of the present invention, there is provided a disc brake comprising friction discs composed of carbon bodies according to the invention.

Other features of the present invention, including preferred product and process variations, and other preferred embodiments, are set forth in the detailed description which follows.

BRIEF DESCRIPTION OF THE DRAWINGS

FIG. 3 is a schematic representation of a disc brake utilizing friction discs having the shapes illustrated in FIGS. 1 and 2.

FIG. 4 is a section, taken along line 4—4 of FIG. 3, of an internally indented element which forms a portion of the disc brake of FIG. 3, and interacts with discs of the shape illustrated in FIG. 1.

FIG. 5 is a section, taken along line 5—5 of FIG. 3, of an externally indented element which forms a portion of the disc brake of FIG. 3, and interacts with discs of the shape illustrated in FIG. 2.

FIG. 6 illustrates a first prior art carbon fiber orientation, obtained by stacking layers of carbon cloth such that the running direction of the carbon cloth is approximately perpendicular to the axis of the carbon body.

FIG. 7 is a section, taken along line 7—7 of FIG. 6, of the carbon body illustrated in FIG. 6.

FIG. 9 illustrates a second prior art carbon fiber orientation, obtained by circumferentially wrapping strips of carbon cloth tightly about a mandrel.

FIG. 10 is a section, taken along line 10—10 of FIG. 9, of the carbon body illustrated in FIG. 9.

FIG. 12 illustrates the fiber orientation in a carbon body according to a first preferred embodiment of the present invention.

FIG. 13 is a section, taken along line 13—13 of FIG. 12, of the carbon body illustrated in FIG. 12.

FIG. 14 illustrates the fiber orientation in a carbon body according to a second preferred embodiment of the present invention.

FIG. 15 is a section, taken along line 15—15 of FIG. 14, of the carbon body illustrated in FIG. 14.

FIG. 16 illustrates the fiber orientation in a carbon body according to a third preferred embodiment of the present invention.

FIG. 17 is a section, taken along line 17—17 of FIG. 16, of the carbon body illustrated in FIG. 16.

FIG. 18 illustrates the fiber orientation in a carbon body according to a fourth preferred embodiment of the present invention.

FIG. 19 is a section, taken along line 19—19 of FIG. 18, of the carbon body illustrated in FIG. 18.

DETAILED DESCRIPTION

The reinforced carbon bodies to which the present invention is applicable include all carbon-fiber reinforced carbon bodies having shapes which admit of successive circumferential winding of the reinforcing fibers. Examples of such shapes include annular shapes, for which the reinforcing fibers can be wound about a mandrel having an outside diameter corresponding to the inside diameter of the desired carbon body; and solid cylindrical shapes, for which the reinforcing fibers can be wound about a very thin mandrel, the mandrel being retracted after winding to leave little or no volume to be filled in with matrix carbon (i.e., carbon other than that derived from the reinforcing fibers). Also included within the scope of shapes of carbon bodies which can be made according to the present invention are prisms, rectangular solids, and hollow rectangular bodies which can, if desired, be machined into flat plates or other desired ultimate shapes. Thus, the carbon bodies of the present invention are useful for a wide variety of applications, wherever strong, light weight bodies are needed.

Figure 1:
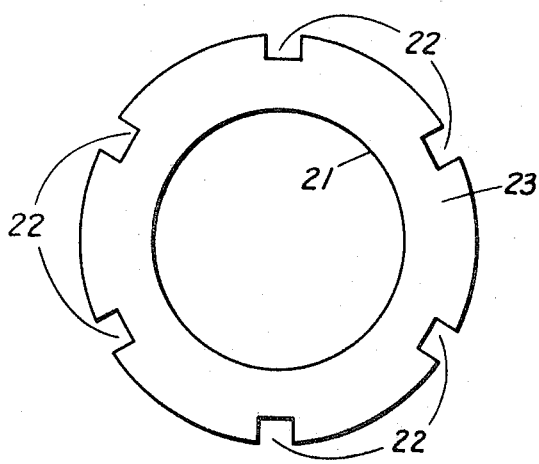
FIGS. 1 and 2 illustrate desired shapes of friction discs for disc brakes, such as might be made from carbon bodies, according to the present invention.
Figure 2:
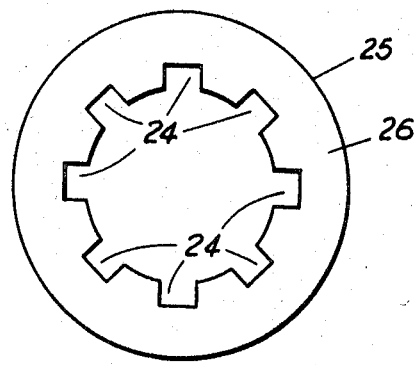

Specifically included within the scope of the present invention are annular shapes having irregular inner or outer perimeters, with either uniform or nonuniform radial depths. Examples of such shapes are illustrated in FIGS. 1 and 2. Carbon bodies of these shapes have utility as friction discs for disc brakes.

FIG. 1, for example, represents an externally indented annular friction disc, comprising a circular inner perimeter 21; an outer perimeter provided with indentations (keyways) 22 adapted to bear circumferential stress; and two opposite faces (only one of which, 23, is shown in FIG. 1), each face adjoining both the inner and outer perimeters. At least one face 23 is substantially flat and substantially perpendicular to the axis of the friction disc.

FIG. 2 represents an internally indented annular friction disc, comprising an inner perimeter provided with indentations (keyways) 24 adapted to bear circumferential stress; a circular outer perimeter 25; and two opposite faces (only one of which, 26, is shown in FIG. 2), each face adjoining both the inner and outer perimeters. At least one face 26 is substantially flat and substantially perpendicular to the axis of the friction disc.

The shape of the external indentations 22 in FIG. 1 and internal indentations 24 in FIG. 2 is commonly rectangular, as shown. Other shapes, such as various types of scallops, can also be used, however. At least one face of each disc should be substantially flat and substantially perpendicular to the axis of the disc, but preferably both faces are so.

Friction discs having the shapes illustrated in FIGS. 1 and 2 can be utilized in disc brakes such as schematically indicated in FIGS. 3 to 5. Internally indented friction discs 27 have the shape illustrated in FIG. 2, and externally indented friction discs 28 have the shape illustrated in FIG. 1. At least one (preferably a plurality) of each type of disc (only one of each being shown in FIG. 3) is coaxially aligned with an externally indented coacting element (e.g., a torque tube) 29, which is provided with indentations 29a (see FIG. 5) which interfit between and engage indentations 24 (see FIG. 2) of friction discs 27, yet allow free rotation of friction discs 28. Also coaxially aligned with discs 27 and 28 and with coacting element 29 is internally indented coacting element (e.g., a wheel hub) 30, which is provided with indentations 30a (see FIG. 4) which interfit between and engage indentations 22 (see FIG. 1) of friction discs 28, yet allow free rotation of friction discs 27.

So constructed, one portion of the brake (either discs 27 and their coacting element 29, or discs 28 and their coacting element 30) is free to rotate with respect to the other portion. When it is desired to activate the brake (i.e., to arrest the rotary motion of the rotating portion of the brake), discs 27 and 28 are pressed together axially to cause contact between the rotating and nonrotating discs. Accordingly, there must be provided means (not shown) for urging the friction discs 27 and 28 into mutual contact, whereby to arrest rotary motion of one coacting element relative to the other coacting element. When contact occurs, the mechanical energy of the rotating portion of the brake, and of the rotating body which is affixed thereto, is converted to heat.

From the above description, it can be seen that friction discs for use in disc brakes should be strong to withstand the shock of use. They should have a high heat capacity and be stable up to a high temperature, to enable the absorption of much energy without deterioration. They should have a high thermal conductivity in order to effectively utilize the entire volume of the friction disc for heat absorption. They should have a high coefficient of friction, at least in the portion of the disc to be subjected to contact with adjacent discs, in order to promptly arrest rotary motion of the rotating discs. They should be stable up to a high temperature (i.e., should not melt or disintegrate at too low a temperature) in order to absorb large quantities of energy as heat. Their density should be high enough to enable substantial amounts of energy to be absorbed, but in many situations (such as aircraft and other vehicles) their density should not be so high as to make their weight unduly burdensome.

In view of these requirements, the properties of carbon render it useful for brake discs, particularly when weight is a major consideration. In order to increase the strength of the carbon bodies used for such purposes, the use of carbon-fiber reinforced carbon bodies, such as illustrated in FIGS. 6, 7, 9 and 10, has been proposed.

Figure 6:
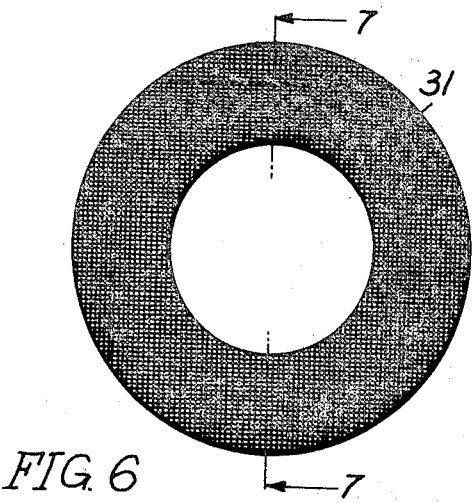
FIGS. 6, 7, 9, 10 and 12–19 illustrate carbon fiber orientations in carbon fiber reinforced carbon bodies intended for fabrication into brake discs of the shape illustrated in FIG. 1.
Figure 7:
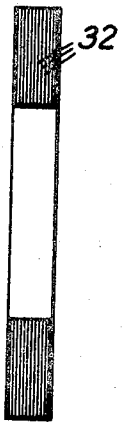
Figure 8:
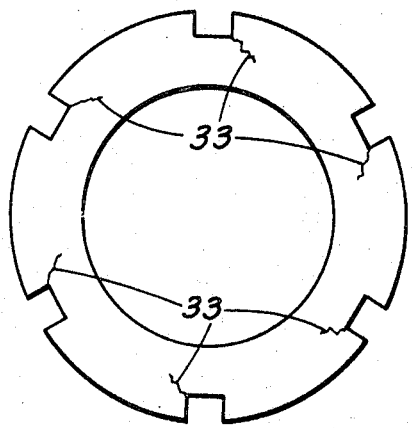
FIG. 8 illustrates a brake disc made from a carbon body having the fiber orientation of FIGS. 6 and 7, showing a type of mechanical failure to which such brake discs are subject.

In FIGS. 6 and 7, a prior art reinforcing carbon fiber configuration is illustrated. This configuration is obtained by stacking sheets of carbon cloth so that the running direction of the cloth is approximately perpendicular to the axis of the carbon body. Carbon cloth for this configuration is conveniently cut in square or circular sections having a hole at the center, and stacked on a mandrel with each subsequent layer being rotated 45° or 90° with respect to the previous layer. The assembly of stacked carbon cloth can then be cut to an annular shape, compressed, and bound together with a matrix of carbonized binder. Compression is necessary to obtain the desired uniformity and carbon fiber density for proper strength. The result is a carbon body as illustrated in FIGS. 6 and 7, with a friction surface 31 comprising a single layer of carbon cloth, and an interior comprising parallel layers (planes) of carbon cloth 32. Carbon bodies having the shape and fiber configuration of FIGS. 6 and 7 are then made into friction discs having the shape of FIG. 1, for example. Such discs are subject to fracture as illustrated in FIG. 8, i.e., along cracks 33. Delamination can also occur.

Figure 9:
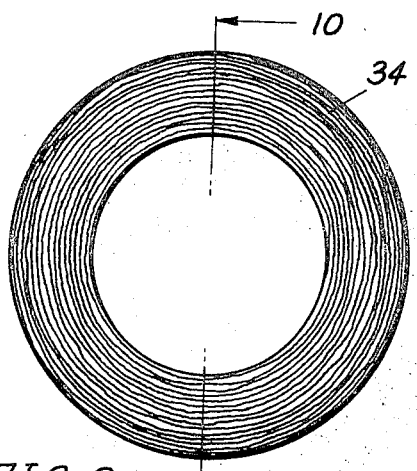
Figure 10:
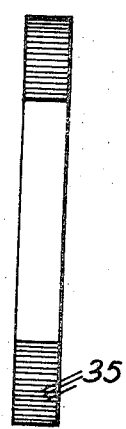

To overcome the shortcomings of the carbon fiber orientation of FIGS. 6 and 7, the carbon fiber orientation of FIGS. 9 and 10 has been proposed. This orientation is obtained by spirally wrapping carbon cloth in tape form (i.e., having a narrow width) tightly about a mandrel. The width of the carbon cloth is usually about the same as the desired axial thickness of the finished carbon body, or perhaps slightly greater to allow for machining to obtain a smooth friction surface. Tight winding about the mandrel has been used in such prior art carbon bodies in order to obtain the desired uniformity and carbon fiber density for proper strength. The result is a carbon body as illustrated in FIGS. 9 and 10, with a friction surface 34 comprising many layers of cloth on edge, i.e., substantially perpendicular to the friction surface 34, and an interior comprising spirally concentric layers (rings) of cloth 35. Carbon bodies having the shape and fiber configuration of FIGS. 9 and 10 are then made into friction discs having the shape of FIG. 1, for example. Such discs avoid the type of failure illustrated in FIG. 8, but are even more prone to delamination, and are subject to fracture as illustrated in FIG. 11, i.e., along cracks 36.

Figure 11:
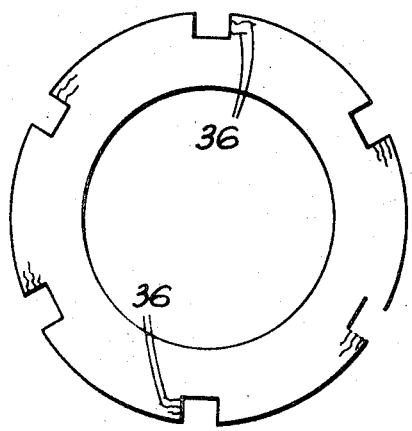
FIG. 11 illustrates a brake disc made from a carbon body having the fiber orientation of FIGS. 9 and 10, showing a type of mechanical failure to which such brake discs are subject.

Failure of friction discs in disc brakes as illustrated in either FIG. 8 or FIG. 11 is, of course, undesirable. The present invention provides a reinforcing carbon fiber orientation which overcomes these problems. Broadly stated, this fiber orientation comprises successively circumferentially wound, axially compressed, radially overlapping reinforcing carbon fibers. "Successive circumferential winding" includes a number of specific types of windings. One such type is ordinary spiral winding such that the width of cloth runs in the direction of the axial thickness of the carbon body, as illustrated in FIGS. 9 and 10 (there shown without radial overlapping, however, which is an important feature of the present invention). In such a case while the cloth itself is spirally wound, it includes both spirally wound fibers (e.g., warp yarns) and non-spirally wound fibers (e.g., fill yarns which are woven among the spirally wound warp yarns). A second type of successive circumferential winding in which all the fibers are spirally wound, is successive helical winding of unwoven yarns or filaments, sometimes known as "spool winding." As used herein, "unwoven" means "not woven," rather than "previously woven." A third type of successive circumferential winding is the winding of thin strips of woven cloth (thinner than the axial thickness of winding) in a successive helical fashion. Other types of successive circumferential windings can also be used.

The first step of the preferred process for producing carbon bodies according to the present invention consists in successively circumferentially winding reinforcing carbon fibers loosely about a mandrel to form an assembly of loosely wound carbon fibers. A preferred process for producing such fibers is described in M. T. Cory, U.S. Pat. No. 3,508,871. Other processes can be used, however, such as that of W. T. Soltes, U.S. Pat. No. 3,011,981. The winding should be continued until the outer perimeter of the carbon fiber assembly is at least as great as the length, but does not necessarily have the shape, of the desired outer perimeter of the finished carbon body. Thus, if it is desired to produce a carbon body having the shape of a solid right circular cylinder, winding can merely continue until the desired outer diameter is obtained. If, however, it is desired to produce a body having a non-circular outer perimeter, such as illustrated in FIG. 1, the outer diameter of the carbon fiber assembly will be at least somewhat greater than the desired outer diameter of the finished carbon body, in order to allow for indentations 22 of the carbon body as shown in FIG. 1. While it is usually desirable that the outer perimeter of the assembly of carbon fibers approximate the length of the outer perimeter of the carbon body, in some cases it is desirable that the outer perimeter of the carbon fiber assembly exceed that of the carbon body in order to achieve circumferential overlapping of the carbon fibers, as described below with reference to FIG. 18.

It should be noted here that the "finished carbon body" according to the present invention (i.e., the carbon body after the reinforcing carbon fibers and carbonized binder matrix are formed into an integral body, but before portions of that body are machined away) can be much closer to the shape ultimately desired, without creating surface weaknesses, than was the case with the prior art methods discussed above.

The width of the assembly of successively circumferentially wound carbon fibers, whatever type of winding is used, should be substantially greater than the desired axial thickness of the finished carbon body. It is preferred that the assembly of carbon fibers, prior to axial compression, have a width ranging from about 1.25 to about 3 times the desired axial thickness of the carbon body, in order to obtain the proper degree of radial overlapping; about two times the thickness has been found to be highly effective. Thus if the assembly of fibers is prepared by spirally winding carbon cloth, the ratio of the width of the carbon cloth to the desired axial thickness of the finished carbon body preferably ranges from about 1.25:1 to about 3:1, about 2:1 being especially preferred. Similar ratios of the width of unwoven carbon yarn to desired axial thickness apply when the assembly of carbon fibers comprises unwoven carbon yarn. The greater width is necessary to allow axial compression of the reinforcing carbon fibers to (1) obtain the proper fiber density and simultaneously (2) cause radial overlapping of the reinforcing fibers.

Radial overlapping is illustrated in FIGS. 13, 15, 17 and 19. In the case of spirally wound cloth, radial overlapping prevents adjacent spirally wound warp yarns from being equidistant from the axis of the carbon body, as was the case in the configuration of FIGS. 9 and 10. See for example, the reinforcing carbon cloth shown in section in these 3 figures, i.e., axially compressed, radially overlapping reinforcing carbon cloth layers 37a–37o in FIG. 13. In the case of successively helically wound nonwoven yarn, the same overlapping occurs with successive windings. Radial overlapping, while causing a crumpled appearance in the assembly of reinforcing carbon fibers, contributes substantially to the strength of the finished carbon body.

In preferred embodiments of the present invention, the carbon bodies have at least one perimeter which is adapted to bear circumferential stress, for example by virtue of indentations in the perimeter such as indentations 22 in FIG. 1 or indentations 24 in FIG. 2. Occasionally it may be desirable that both the inner and outer perimeters be so adapted to bear circumferential stress. In any of these situations (inner, outer, or both perimeters indented to bear circumferential stress), it is preferred that the carbon body comprise reinforcing carbon fibers adjacent to the indented perimeter or perimeters which fibers conform substantially to the shape of the indented perimeter or perimeters, including the indentations therein.

The fabrication of carbon bodies having irregular perimeters and consequently circumferentially nonuniform radial depths presents a problem when the reinforcing carbon fibers are successively circumferentially wound, since the portions of the carbon bodies having shorter radial depth tend to have greater fiber density unless steps are taken to balance the fiber density of the underlying network of reinforcing carbon fibers to compensate for the circumferentially nonuniform radial depth. A balanced fiber density is generally desirable in order to maximize the strength of the carbon body in all locations. It is frequently desirable that the very locations which would have a low fiber density if no steps were taken to balance the fiber density, i.e., the locations of greater radial depth, should have the greatest strength. Such is the case in friction discs having shapes such as those of FIGS. 1 and 2, in which strength is needed between keyways 22 of FIG. 1 and between keyways 24 of FIG. 2.

Broadly stated, the fiber density can be balanced by four methods, namely (1) providing supplemental carbon in locations of greater radial depth; (2) removing excess fibers in locations of lesser radial depth; (3) conforming a perimeter of the reinforced carbon body which is not to be subjected to circumferential stress to a geometric shape which compensates for the circumferential non-uniformities in radial depth; and (4) circumferentially overlapping the reinforcing carbon fibers in locations of greater radial depth.

Figure 12:
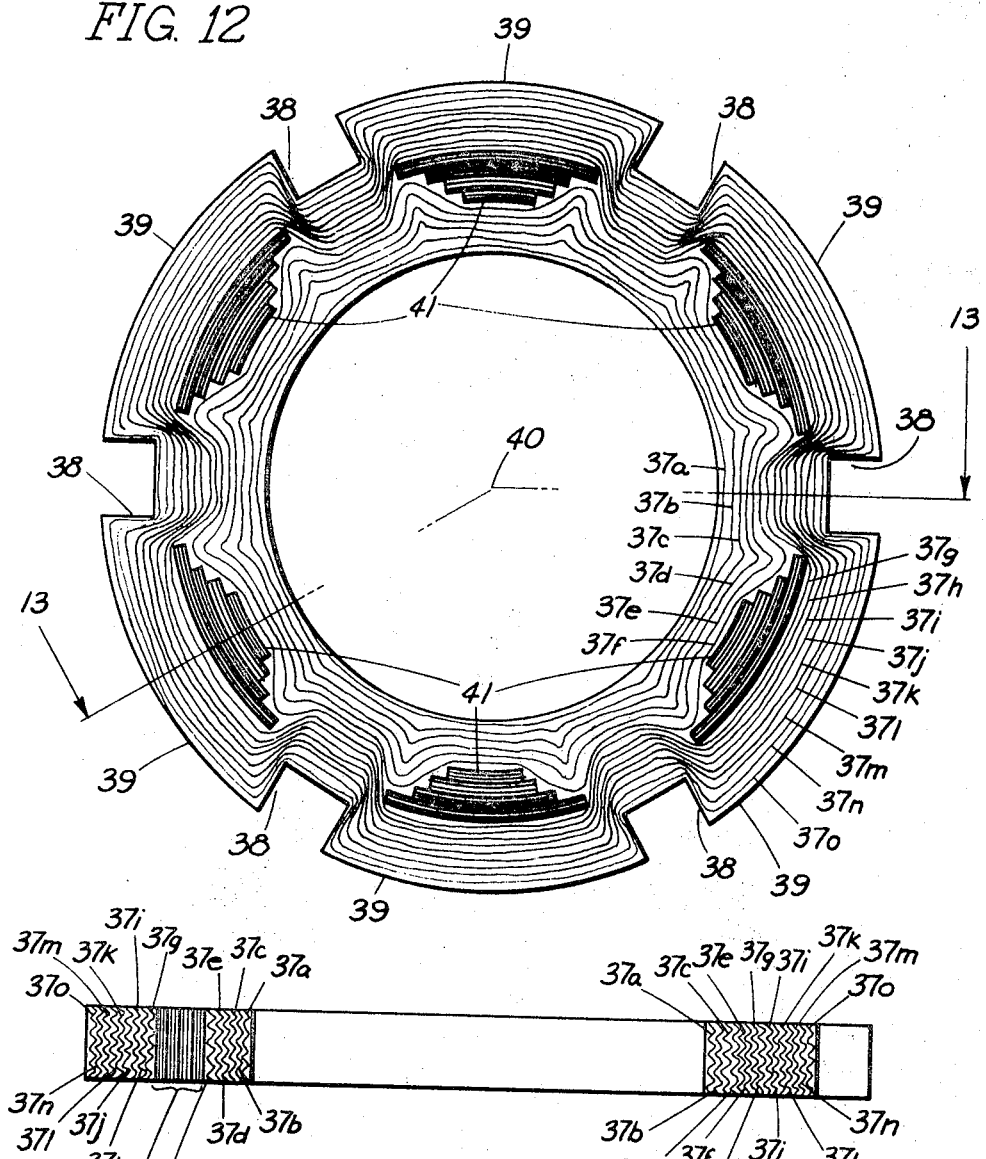
Figure 13:
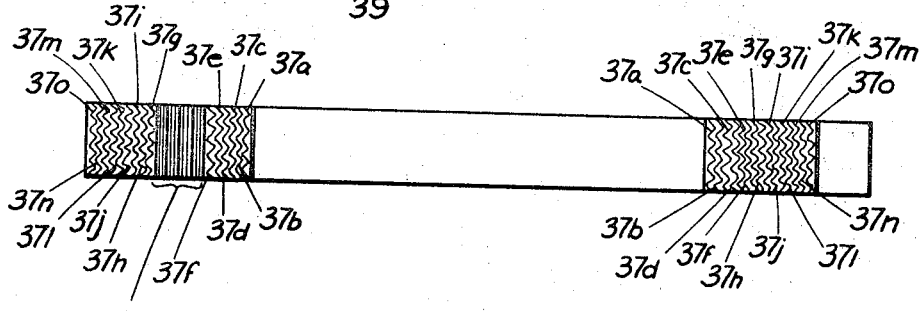

Two embodiments of the first method are illustrated in FIGS. 12–13 and 14–15, respectively. FIGS. 12 and 13 illustrate a carbon body in the form of a disc brake friction disc in which the reinforcing fibers are circumferentially wound, axially compressed, radially overlapping carbon cloth (layers 37a–37o). The keyways 38 in the shape of FIG. 12 are responsible for locations 39 of greater radial depth, between the keyways 38; and locations of lesser radial depth, between each keyway 38 and the axis 40 of the carbon body. In order to compensate for this circumferentially nonuniform radial depth, supplemental carbon is provided in the locations of radial depth. In this embodiment, the supplemental carbon is in the form of supplemental carbon cloth assemblies 41 which are inserted between circumferential windings 37f and 37g of the reinforcing carbon fiber assembly. Other forms of carbon can also be inserted, e.g., powder, solid carbon, or compacted powder. It is convenient to provide differing widths of carbon cloth in assemblies 41 as shown in FIG. 12, so that a gradual balancing effect is achieved. It should be noted that in this and carbon other embodiments of the invention in which circumferentially non-uniform radial depths are balanced, exact balancing (i.e., equality of fiber density) is usually not necessary.

Figure 14:
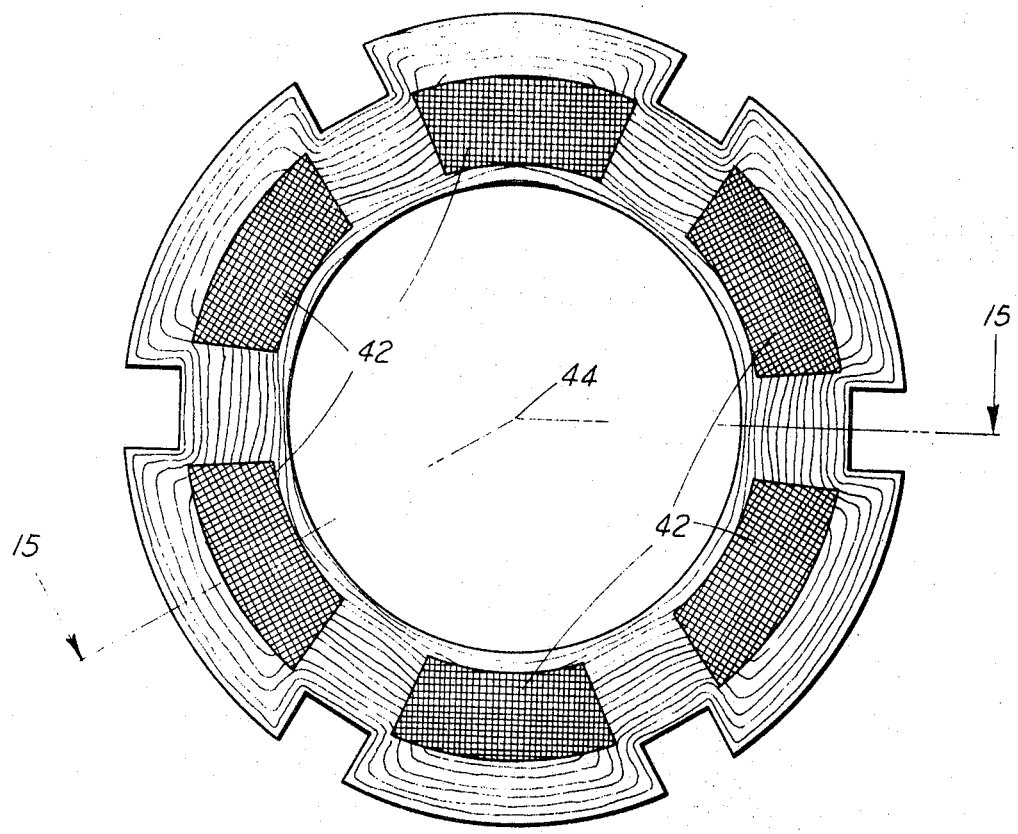
Figure 15:
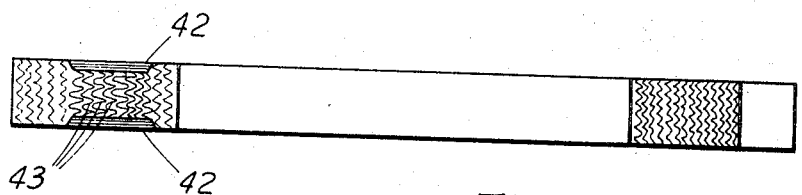

FIGS. 14 and 15 illustrate a carbon body similar to that of FIGS. 12 and 13. In the carbon body of FIGS. 14 and 15, however, the supplemental carbon is in the form of supplemental carbon cloth assemblies 42 which are positioned adjacent to the circumferentially wound reinforcing carbon fibers in locations of greater radial depth. In this case, the portions 43 of certain carbon cloth layers between carbon cloth assemblies 42 are axially compressed and radially overlapped to a greater extent than the cloth which is not between carbon cloth assemblies 42. As a result, these portions of layers 43 occupy a greater radial depth than an equal number of layers not between assemblies 42, whether other portions of the same carbon cloth layers, or other complete layers. As with the embodiment illustrated in FIGS. 12 and 13, assemblies 42 conveniently comprise carbon cloth of varying widths, as shown in FIG. 15, in order to obtain a gradual balancing effect. In the case where the carbon bodies are to be used as brake discs, it is useful to position the supplemental carbon radially in locations to be subjected to frictional contact with adjacent brake discs, i.e., as illustrated in FIG. 14 with the maximum distance of carbon cloth assemblies 42 from the axis 44 of the carbon body being less than the minimum distance of the keyways from the axis 44. The supplemental carbon assemblies 42 can thus also function as wear pads to improve the frictional qualities of the brake disc. In such a case it is beneficial to include within the wear pads (assemblies 42) materials which increase their coefficient of friction. A material which has been found particularly useful to increase the coefficient of friction in such cases is ditungsten monoboride, $W_2B$. $W_2B$ also increases the oxidation resistance of the carbon body, as described in copending commonly assigned U.S. Patent application Ser. No. 722,158, filed Apr. 18, 1968, by L. C. Ehrenreich, now U.S. Pat. No. 3,672,936. Other materials which can be included within the carbon body to enhance the oxidation resistance, frictional qualities or other properties include boron, niobium, silicon, tantalum, titanium, tungsten and zirconium; other borides of tungsten, and borides of niobium, silicon, tantalum, titanium, and zirconium; carbides of boron, niobium, silicon, tantalum, titanium, tungsten and zirconium; and nitrides of aluminum, boron, niobium, silicon, tantalum, titanium, tungsten and zirconium. Mixtures and combinations of these materials can also be used. For example, it is preferred when producing carbon bodies for brake discs to include $W_2B$ in portions of the discs to be subjected to friction with adjacent discs, and boron in portions of the discs not to be subjected to friction with adjacent discs, since $W_2B$ increases but boron reduces the coefficient of friction, while both serve as oxidation inhibitors. Additives are preferably added in particulate form (e.g., about 0.25 millimeter particles), although particle size is not critical. The amount of particulate additives should usually range from about 0.25 to about 5 percent by volume of the portion of the carbon body containing the additive. The use of additives, of course, is not limited to situations where it is necessary to balance fiber density to compensate for circumferentially nonuniform radial depth. For example, where interlaminar shear strength is an important factor, regardless of the shape of the carbon body, it is advantageous to include carbon fibers coated with from about 10 percent to about 30 percent by weight of a refractory material, as described in copending commonly assigned U.S. Patent application Ser. No. 644,623, filed June 8, 1967, by W. H. Carlson and J. J. McGahan and now abandoned. Silicon carbide is the preferred refractory coating for this purpose.

A second method of balancing fiber density, instead of providing supplemental carbon in location of greater radial depth, is removing excess fibers in locations of lesser radial depth. One way of accomplishing excess fiber removal is by cutting away portions of the circumferentially wound carbon fibers (including, in the case where carbon cloth is used to provide the circumferentially wound reinforcing fibers, fill yarns which are not circumferentially wound). A second way of accomplishing excess fiber removal, when carbon cloth provides circumferentially wound reinforcing fibers, is removal of the fill yarns only, in locations of lesser radial depth.

Figure 16:
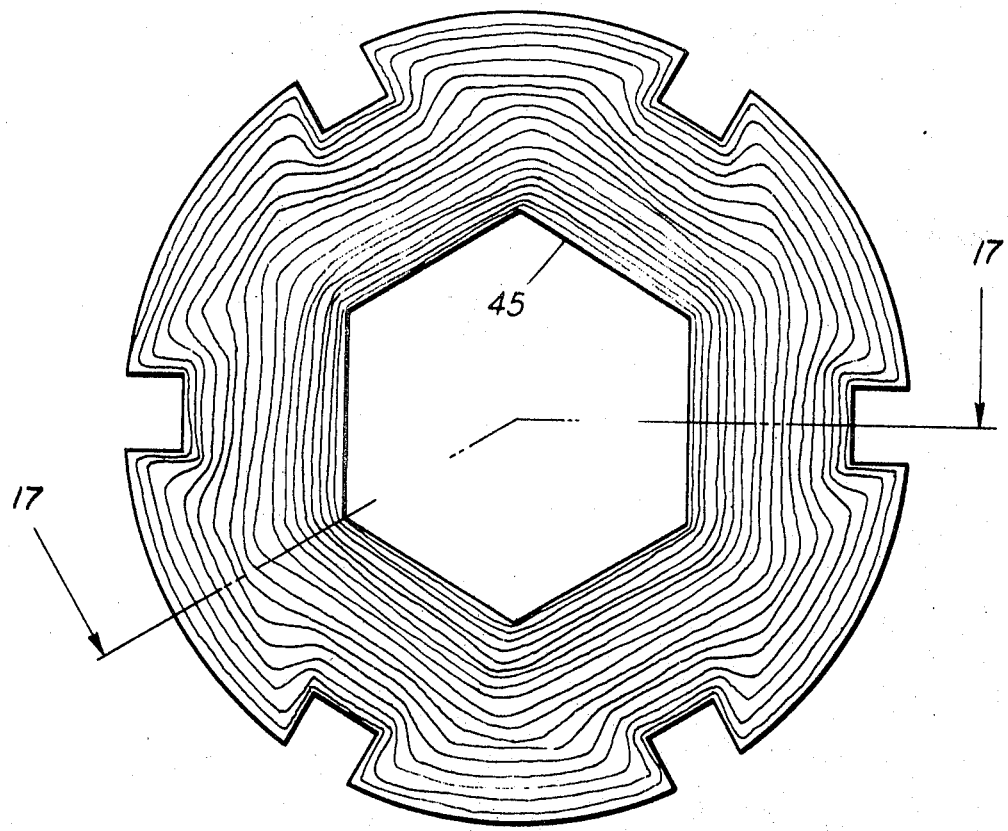
Figure 17:
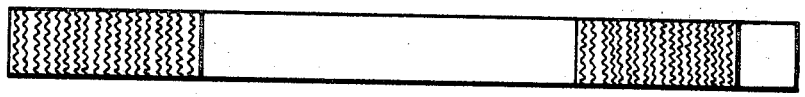

A third method of balancing fiber density is illustrated in FIGS. 16 and 17. In this third method of perimeter 45 which is not to be subjected to circumferential stress is conformed to a shape (e.g., a polygon having as many sides as there are locations of lesser radial depth) which compensates for the circumferential nonuniformities in radial depth.

Figure 18:
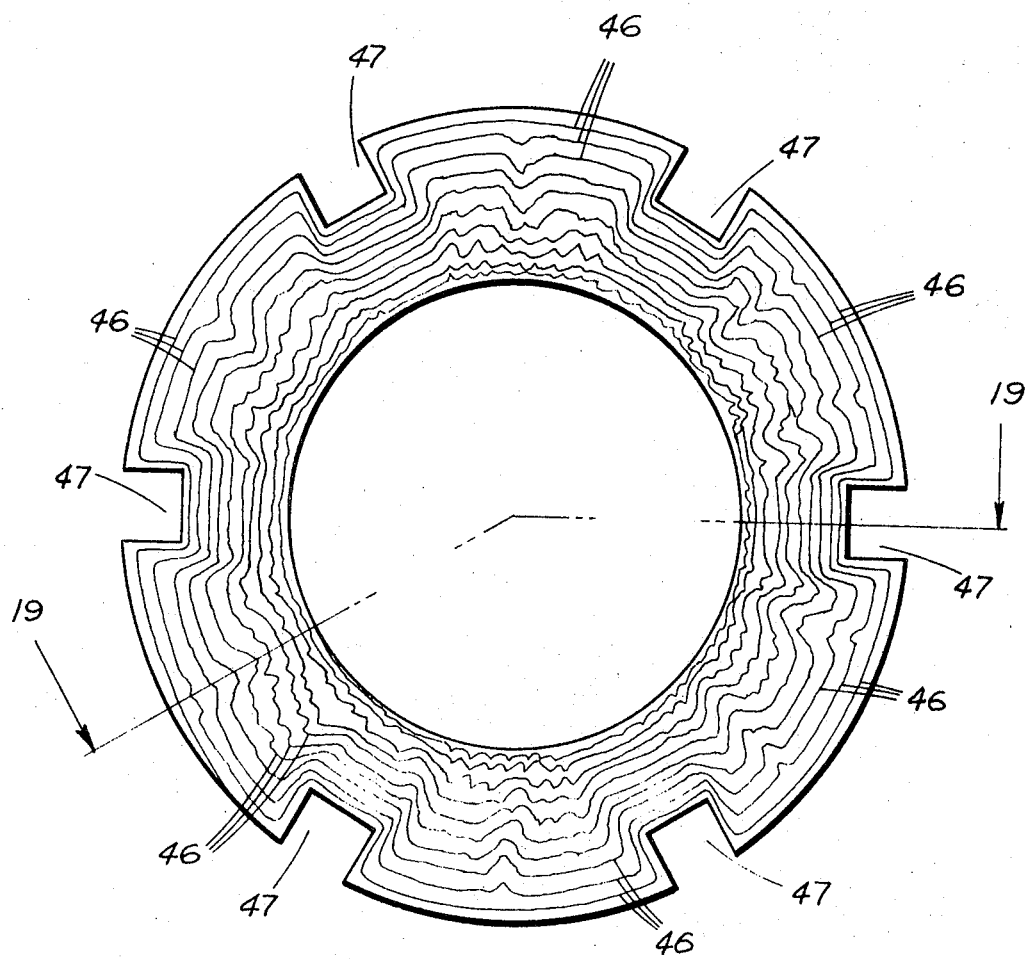
Figure 19:
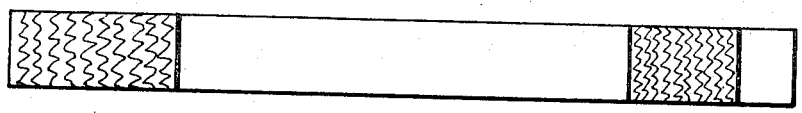

A forth method of balancing fiber density is illustrated in FIGS. 18 and 19. In this fourth method, the reinforcing carbon fibers in locations of greater radial depth are circumferentially overlapped, as well as radially overlapped. This circumferential overlapping can be accomplished by (a) winding the assembly of loosely wound reinforcing carbon fibers in an annular shape (regardless of whether the finished carbon body is to be annular or not), one perimeter of which is greater in length than the corresponding perimeter of the desired carbon body, then (b) radially compressing the annular assembly of reinforcing carbon fibers, prior to axial compression. In the case of a solid (non-annular) carbon body, the entire center of the annulus is taken up, by radial compression, with carbon fibers. In the case of an annular carbon body, one perimeter of the carbon fiber assembly (the inner perimeter, in the example illustrated in FIGS. 18 and 19) is wound to a length greater than that of the inner perimeter of the carbon body. The fiber assembly is then placed in the mold with radial compression, and the excess length of carbon fibers 46 occupies the extra space caused by the greater radial depth between keyways 47. When the inner perimeter is to bear circumferential stress, it is the outer perimeter which is wound to a length greater than that of the outer perimeter of the carbon body. The excess length of carbon fibers again occupies the extra space caused by the greater radial depth.

These various methods can of course be used in combination. Although the above description is illustrated with cloth windings and supplemental carbon cloth, other types of windings and supplemental carbon, as described above, can also be used.

In producing the assembly of loosely wound carbon fibers, it is desirable at times to enhance the looseness of the loosely wound carbon fibers in order that when the assembly is axially compressed, a proper fiber density will be obtained, and in order that the carbon fibers will conform properly to any irregularities in the perimeter of the carbon body. This enhancement of looseness can be accomplished by the use of temporary spacers, inserted among the carbon fibers during winding, and removed prior to axially compressing the fibers within the mold. These spacers can be either circumferentially uniform, such as cardboard or other material inserted within the assembly of carbon fibers during winding at intervals; or they can be placed in portions of the carbon fiber assembly corresponding to locations of lesser radial depth of the desired carbon body, in which case the spacers aid in conforming the fibers to the noncircular perimeter by increasing the length of the perimeter of carbon fibers being wound. Combinations of both circumferentially uniform and nonuniform spacers can be used, and in fact are preferred.

Once the assembly of carbon fibers is produced, it is axially compressed to cause radial overlapping of the reinforcing carbon fibers. This is preferably accomplished by (1) placing the assembly of loosely wound carbon fibers in a mold cavity comprising (a) an outer perimeter conforming substantially to the desired size and shape of the outer perimeter of the desired carbon body; and (b) a pair of compression plates having mutually opposed faces which conform substantially to the desired sizes and shapes of the faces of the desired carbon body; and (2) axially moving the compression plates together until they are separated by approximately the desired axial thickness of the finished carbon body. If the shape of the finished carbon body is annular, the mold should have an inner perimeter as well, which inner perimeter should conform substantially to the desired size and shape of the inner perimeter of the desired carbon body. The mold outer perimeter, compression plates, and mold inner perimeter, if any, define a mold cavity. If it is desired to produce a number of carbon bodies simultaneously, each having the same perimeters, it is preferred to use a single mold provided with a number of compression plates, i.e., one in excess of the number of carbon bodies to be produced simultaneously. The compression plates should then have mutually opposed faces which conform substantially to the desired sizes and shapes of the faces of the carbon bodies, so that a minimum of machining will be required; each pair of opposed compression plates will form, with the mold outer perimeter and mold inner perimeter, if any, a mold cavity. For the production of brake discs, it is preferred that the plates be essentially flat, mutually parallel, and perpendicular to the axis of the carbon body. In any case, the plates should be coaxially aligned with each other and with the mold perimeter or perimeters, and the distances between the plates should be axially variable. In any mold, one plate (either an end plate or an interior plate) can be fixed axially, if desired.

When placing the assembly of carbon fibers within the mold, it is sometimes desirable to apply marking means to the assembly of carbon fibers, prior to placing the assembly of fibers within the mold, so that after the assembly of fibers is placed within the mold, the marking means can be realigned to its original orientation, whereby to facilitate circumferentially even distribution of the reinforcing carbon fibers within the carbon body. Such means is preferably radial, so that each marked radius is merely reoriented in its original radial position. The marking means should preferably be a material which leaves only a carbon residue, if any; paraffin wax has been found to serve this prupose well, as it can be realigned either visually or by touch.

In addition to forming an assembly of loosely wound carbon fibers and axially compressing the fibers to cause radial overlapping, it is necessary to introduce a carbonizable binder between the carbon fibers and carbonize the binder to form a carbon matrix binding together the reinforcing carbon fibers. If desired, the fibers can be pre-impregnated with carbonizable binder before assembly, but it is preferred to assemble the fibers without binder. The introduction and carbonization of the binder is then preferably accomplished by (1) subjecting the assembly of loosely wound carbon fibers within the mold to a partial vacuum, the absolute pressure of said partial vacuum being less than about 100 mm Hg; preferably less than about 10 mm Hg; (2) impregnating the loosely wound assembly of carbon fibers, within the mold and prior to axial compression, with a heat-curable carbonizable binder; (3) placing the impregnated shape of carbon fibers under axial compression to cause radial overlapping of the circumferentially wound carbon fibers, and to remove excess binder between the fibers; (4) placing the compressed, impregnated assembly of carbon fibers under pressure and temperature to cure the carbonizable binder; (5) baking the assembly of carbon fibers containing cured binder in a protective atmosphere to carbonize the cured binder; and (6) subjecting the baked assembly to at least one additional cycle of partial vacuum, impregnation, curing and carbonizing operations, each cycle comprising (a) subjecting the baked assembly to a partial vacuum, the absolute pressure of said partial vacuum being less than about 100 mm Hg, preferably less than about 10 mm Hg; (b) reimpregnating the baked assembly with heat-curable carbonizable binder; (c) placing the reimpregnated assembly of carbon fibers under pressure and temperature to cure the carbonizable binder; and (d) baking the cured reimpregnated assembly in a protective to carbonize the cured binder.

The assembly of loosely wound carbon fibers is preferably compressed to a fiber density of from about 0.6 to about 1.2 grams per cubic centimeter; a fiber density of from about 0.8 to about 0.95 grams per cubic centimeter is more highly preferred. The compressed carbon fibers preferably constitute from about 40 to about 90 percent by volume of the finished carbon body; a range of from about 60 to about 70 percent is more highly preferred. The preferred carbonizable binder comprises furfural and furfuryl alcohol in a ratio of from about 2:3 to about 3:2 by weight (1:1 is highly convenient and effective), containing from about 3 to about 5 parts by weight of maleic anhydride per 100 parts furfural and furfuryl alcohol mixture. With such a binder, it is preferable to impregnate and reimpregnate the carbon fibers at a pressure of at least about 8 kilograms per square centimeter for at least about 1½ hours, and to cure the binder, after each impregnation and reimpregnation, at a temperature of at least about 125°C and a pressure of at least about 6 kilograms per square centimeter, maintained for at least about 8 hours. It is also preferred to carbonize the cured binder after each cure by baking slowly in a protective atmosphere (e.g., nitrogen) for example by raising the temperature 5 centigrade degrees per hour up to 450°C, then 20 centigrade degrees per hour up to 800°C. It is also preferable to drive out all the remaining volatile materials at least once during processing, after the assembly is first baked, but prior to the last cycle of partial vacuum, impregnation, curing and carbonizing operations, by raising the temperature to at least about 1500°C. Further preferred processing conditions are described in C. W. Rohl and J. H. Robinson, U.S. Pat. No. 3,462,289.

I claim:
1. A disc brake, comprising in combination
   1. At least one internally indented annular friction disc, having a shape which comprises
      a. an inner perimeter provided with indentations adapted to bear circumferential stress;
      b. an outer perimeter; and
      c. two opposite faces, each face adjoining both the inner perimeter and the outer perimeter, at least one face being substantially flat and substantially perpendicular to the axis of the friction disc;
   2. at least one coaxially aligned externally indented annular friction disc, having a shape which comprises
      a. an inner perimeter;
      b. an outer perimeter provided with indentations adapted to bear circumferential stress; and
      c. two opposite faces, each face adjoining both the inner perimeter and the outer perimeter, at least one face being substantially flat and substantially perpendicular to the mutual axis of the friction discs;
   3. an externally indented coacting element, coaxially aligned with the friction discs, having indentations which interfit between and engage the indentations of the internally indented friction discs, yet allow free rotation of the externally indented friction discs;
   4. an internally indented coacting element; coaxially aligned with the friction discs and with the externally indented coacting element, having indentations which interfit between and engage the indentations of the externally indented friction discs, yet allow free rotation of the internally indented friction discs; and
   5. means for axially urging the friction discs into mutual contact, whereby to arrest rotary motion of one coacting element relative to the other coacting element;
   wherein the improvement comprises
      1. the internally indented friction discs each comprising
         a. an underlying network of reinforcing carbon fibers, comprising fibers which are successively circumferentially wound, axially compressed, and radially overlapped throughout the circumference of the disc in each cross-sectional plane containing the axis of the disc; the circumferentially wound reinforcing fibers adjacent to the inner perimeter conforming substantially to the shape of said inner perimeter; and
         b. a matrix of carbonized binder binding together the underlying network of reinforcing fibers; and
      2. the externally indented friction discs each comprising
         a. an underlying network of reinforcing carbon fibers, comprising fibers which are successively circumferentially wound, axially compressed, and radially overlapped throughout the circumference of the disc in each cross-sectional plane containing the axis of the disc; the circumferentially wound reinforcing fibers adjacent to the outer perimeter conforming substantially to the shape of said outer perimeter; and
         b. a matrix of carbonized binder binding together the underlying network of reinforcing fibers.

2. A disc brake according to claim 1, comprising a plurality of internally indented friction discs and a plurality of externally indented friction discs, all coaxially aligned and having adjacent faces substantially flat and substantially perpendicular to the mutual axis of the friction discs.

3. A disc brake according to claim 2, wherein the friction discs comprise supplemental carbon positioned radially in portions of the faces of the friction discs to be subjected to contact with adjacent discs, and positioned circumferentially in locations of greater radial depth of the friction discs, whereby to balance the fiber density of the friction discs.

4. A disc brake according to claim 3, wherein said supplemental carbon comprises from about 0.25 to about 5 percent by volume of ditungsten monoboride.

* * * * *